(12) United States Patent
Padmanabhan et al.

(10) Patent No.: US 12,450,525 B2
(45) Date of Patent: Oct. 21, 2025

(54) METHOD AND SYSTEM FOR MODEL AUTO-SELECTION USING AN ENSEMBLE OF MACHINE LEARNING MODELS

(71) Applicant: Kinaxis Inc., Ottawa (CA)

(72) Inventors: Kanchana Padmanabhan, Toronto (CA); Brian Keng, Toronto (CA)

(73) Assignee: Kinaxis Inc., Ottawa (CA)

( * ) Notice: Subject to any disclaimer, the term of this patent is extended or adjusted under 35 U.S.C. 154(b) by 1186 days.

(21) Appl. No.: 17/048,374

(22) PCT Filed: Apr. 17, 2019

(86) PCT No.: PCT/CA2019/050482
§ 371 (c)(1),
(2) Date: Oct. 16, 2020

(87) PCT Pub. No.: WO2019/200480
PCT Pub. Date: Oct. 24, 2019

(65) Prior Publication Data
US 2021/0103858 A1    Apr. 8, 2021

Related U.S. Application Data

(60) Provisional application No. 62/659,174, filed on Apr. 18, 2018.

(51) Int. Cl.
*G06N 20/20* (2019.01)
*G06F 18/20* (2023.01)
(Continued)

(52) U.S. Cl.
CPC ......... *G06N 20/20* (2019.01); *G06F 18/2193* (2023.01); *G06F 18/24765* (2023.01); *G06F 18/285* (2023.01)

(58) Field of Classification Search
CPC ............... G06N 20/20; G06F 18/2193; G06F 18/24765; G06F 18/285
See application file for complete search history.

(56) References Cited

U.S. PATENT DOCUMENTS 8,370,280 B1 * 2/2013 Lin ........................... G06N 5/04
706/12
11,182,691 B1 * 11/2021 Zhang .................... G06N 20/20
(Continued)

OTHER PUBLICATIONS

International Search Report and The Written Opinion for PCT/CA2019/050482 mailed Jul. 8, 2019, 7 pages.
(Continued)

*Primary Examiner* — Hope C Sheffield
(74) *Attorney, Agent, or Firm* — Ruggiero McAllister & McMahon LLC (57) ABSTRACT

A system and method for model auto-selection for a prediction using an ensemble of machine learning models. The method includes: receiving historical data, the historical data including previous outcomes of a plurality of events associated with a plurality of data categories; training candidate machine learning models with the historical data, each candidate machine learning model trained using a respective one of the data categories; and determining an ensemble of machine learning models by determining a median prediction for combinations of candidate machine learning models and determining the combination that has the median prediction that is closest to at least one of the previous outcomes.

20 Claims, 5 Drawing Sheets

(51) Int. Cl.
*G06F 18/21* (2023.01)
*G06F 18/24* (2023.01)

(56) References Cited

U.S. PATENT DOCUMENTS

| | | | | |
|---|---|---|---|---|
| 2015/0379426 A1* | 12/2015 | Steele | ............... | G06N 5/025 |
| | | | | 706/12 |
| 2016/0048766 A1* | 2/2016 | McMahon | ............ | G06Q 40/08 |
| | | | | 706/12 |
| 2018/0346151 A1* | 12/2018 | Sturlaugson | ........... | G06N 20/20 |

OTHER PUBLICATIONS

Li, K. et al.: A Novel Dynamic Weight Neural Network Ensemble Model, 2014 International Conference on Identification, Information and Knowledge in the Internet of Things, Oct. 18, 2014 (Oct. 18, 2014), pp. 22-27.

Wikipedia: Ensemble learning, Mar. 23, 2018 (Mar. 23, 2018), https:// en. wikipedia.org/w /index.php?title=Ensemble_learning &oldid=83 I 990200, retrieved on May 7, 2019 (May 7, 2017).

* cited by examiner

METHOD AND SYSTEM FOR MODEL AUTO-SELECTION USING AN ENSEMBLE OF MACHINE LEARNING MODELS

TECHNICAL FIELD

The following relates generally to cloud computing, and more specifically, to a method and system for model auto-selection using an ensemble of machine learning models.

BACKGROUND

Data science, and in particular, machine learning techniques can be used to solve a number of real world problems. In order to solve such problems, machine learning models are trained with a dataset such that a trained model can be used to automatically discover features or classifications from raw data; and use such determinations to perform a task, such as make predictions or forecasts. Generally, once a model's features are instantiated, it is used to make predictions for subsequently received data. If new feature sets are required, generally the model has to be retrained with these new features. The selection of features generally requires the expertise and selection of a data scientist; thus, every time the model is updated, it requires the hands-on work by the data scientist.

It is therefore an object of the present invention to provide a method and system in which the above disadvantages are obviated or mitigated and attainment of the desirable attributes is facilitated.

SUMMARY

In an aspect, there is provided a method for model auto-selection for a prediction using an ensemble of machine learning models, the method executed on at least one processing unit, the method comprising: receiving historical data, the historical data comprising previous outcomes of a plurality of events associated with a plurality of data categories; training candidate machine learning models with the historical data, each candidate machine learning model trained using a respective one of the data categories; determining an ensemble of machine learning models by determining a median prediction for combinations of candidate machine learning models and determining the combination that has the median prediction that is closest to at least one of the previous outcomes; and outputting the ensemble of models.

In a particular case of the method, the ensemble of models comprises three, four, or five models.

In another case, the candidate machine learning models comprise 25 to 50 models.

In yet another case, the candidate machine learning models comprise 35 models.

In yet another case, determining the combination that has the median prediction that is closest to at least one of the previous outcomes comprises determining the closeness by determining a weighted error measurement (WMAPE) of an error between the prediction of each combination and the respective outcome in the historical data.

In yet another case, determining the combination that has the median prediction that is closest to at least one of the previous outcomes further comprises iteratively determining median values for each of the combinations and discarding the combination of the present iteration if the respective WMAPE is not at least a predetermined amount greater than the previous iteration.

In yet another case, the predetermined amount is 0.1.

In yet another case, the predetermined amount is 0.01.

In yet another case, at least two of the candidate machine learning models are trained in parallel.

In yet another case, the method further comprising receiving at least one input condition for at least one data category, feeding the input condition into the ensemble of models to generate the median prediction, and outputting the median prediction.

In another aspect, there is provided a method for model auto-selection for a prediction using an ensemble of machine learning models, the method executed on at least one processing unit, the method comprising: receiving historical data, the historical data comprising previous outcomes of a plurality of events associated with a plurality of data categories; training candidate machine learning models with the historical data, each candidate machine learning model trained using a respective one of the data categories; determining an ensemble of machine learning models, using a meta-machine learning model, by determining a combination of candidate models that provides a closest prediction for each data category, the meta-machine learning model using the outputs of the trained candidate models and the respective previous outcomes; and outputting the ensemble of models.

In another aspect, there is provided a system for model auto-selection for a prediction using an ensemble of machine learning models, the system comprising one or more processors in communication with a data storage, the one or more processors configurable to execute: a data acquisition module to receive historical data, the historical data comprising previous outcomes of a plurality of events associated with a plurality of data categories; a training module to train candidate machine learning models with the historical data, each candidate machine learning model trained using a respective one of the data categories; an ensemble module to determine an ensemble of machine learning models by determining a median prediction for combinations of candidate machine learning models and determining the combination that has the median prediction that is closest to at least one of the previous outcomes; and an execution module to output the ensemble of models.

In a particular case of the system, the ensemble of models comprises three, four, or five models.

In another case, the candidate machine learning models comprise 25 to 50 models.

In yet another case, the candidate machine learning models comprise 35 models.

In yet another case, determining the combination that has the median prediction that is closest to at least one of the previous outcomes comprises determining the closeness by determining a weighted error measurement (WMAPE) of an error between the prediction of each combination and the respective outcome in the historical data.

In yet another case, determining the combination that has the median prediction that is closest to at least one of the previous outcomes further comprises iteratively determining median values for each of the combinations and discarding the combination of the present iteration if the respective WMAPE is not at least a predetermined amount greater than the previous iteration.

In yet another case, each of the candidate machine learning models are trained in parallel on different subsets of one or more processors of the one or more processors.

In yet another case, the execution module further receives at least one input condition for at least one data category and outputs the median prediction after the input condition is fed into the ensemble of models to generate the median prediction.

In yet another case, outputting the ensemble of models comprises communicating the ensemble of models to a separate computing device.

These and other embodiments are contemplated and described herein. It will be appreciated that the foregoing summary sets out representative aspects of systems and methods to assist skilled readers in understanding the following detailed description.

BRIEF DESCRIPTION OF THE DRAWINGS

The features of the invention will become more apparent in the following detailed description in which reference is made to the appended drawings wherein.

DETAILED DESCRIPTION

Embodiments will now be described with reference to the figures. For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

In the following description, it is understood that the terms "user", "developer", "data-scientist", and "administrator" can be used interchangeably.

Tasks, as referred to herein, can comprise any executable sub-routine or operation; for example, a data gathering operation, a data transformation operation, a machine learning model training operation, a weighting operation, a scoring operation, an output manipulation operation, or the like.

Forecasting, as understood herein, involves a process for obtaining a future value for a subject using historical data. In many cases, forecasts are predicated on there being a plethora of data from which to generate one or more predictions. In these cases, the machine learning techniques disclosed herein can use the historical data in order to train their models and thus produce reasonably accurate forecasts.

In the following, an example of embodiments of the present invention involves generating forecasts or predictions for product sales using historical data of sales of products and product categories. The product sales example is for illustrative purposes only, and the scope of the disclosure herein is understood to be applicable to generation of any suitable forecast using the systems and methods described herein.

In the following, "SKU" refers to a stock keeping unit and can be generally interpreted as referring to a type of product, entity and/or service that is offered for sale.

The following relates generally to cloud computing, and more specifically, to a method and system for model auto-selection in machine learning ensemble approaches.

In some systems that employ machine learning, ensemble approaches can be employed such that multiple machine learning models or techniques are used to obtain potentially better predictive performance than could be obtained by any one of the machine learning models or techniques alone. Ensemble approaches advantageously allow for a potentially more flexible structure and increased predictive power. For example, each of the models in an ensemble may generate predictions based on different features; for example, in the product sales prediction example, some models may have time of year for a product sale as weighted heavily, while others may not use that feature at all. Leveraging different combinations of models each with different features can generally allow for a more robust and accurate prediction.

In many cases, ensemble approaches generally require significant intervention by a data scientist, or other specialist, or require extensive computing resources and retraining.

For example, for ensemble approaches with models that do forecasting, typically a data scientist manually tunes a list of candidate models. The data scientist then runs various experiments to see if the candidate models match a known validation set. To do so, they typically try various features in order to determine a model that works for a set of data categories. In some cases, especially where there are a lot of data categories, this can be prohibitively labor intensive. It would be too intensive to manually tune a model for each category or set of categories. In some cases, some data categories can act differently than each other for example, in the product sales prediction example, product categories may be seasonal, categories may have new products, categories may have high turnover of products. Accordingly, categories may have new features that a corresponding model would need to take into account.

In the above example, generally one set of models is selected to work for all categories. Thus, any improvement to a forecast, such as adjustments if one category is not being forecasted well, requires manual tuning of the model. However, this tuning can, and likely will, have effects on the other categories, possibly in negative ways. Accordingly, in embodiments of the system described herein, one or more candidate models are trained for one of the data categories, then a subset of such models (an ensemble of models) are selected that perform best for that data category. This approach advantageously allows adjustments to the models without affecting other categories.

In some cases, a single ensemble of models can be used across all data categories. For conventional ensemble approaches, when an administrator wants to institute an improvement to a forecast, this generally requires the following; (1) identifying the desired improvements to make, (2) running forecast results across all data categories, and (3) comparing the forecast accuracies to those of the current ensemble of models. In an example, an improvement is generally considered useful only if it improved the majority of the data categories. As the Applicant tested out more improvements, it was determined that often most improvements only worked for a subset of categories.

Generally, different data categories may behave differently and so forcing a single ensemble to work for all categories may not be ideal. However, on the other hand, fine tuning and selecting an ensemble per category cannot be accomplished manually as it is an enormous task. Hence, the embodiments disclosed herein provide a technological solution to provide an automated way to select an ensemble model configuration per category. As described, such a selection can be re-run periodically, for example every month, to update the ensemble model configuration.

Figure 1:
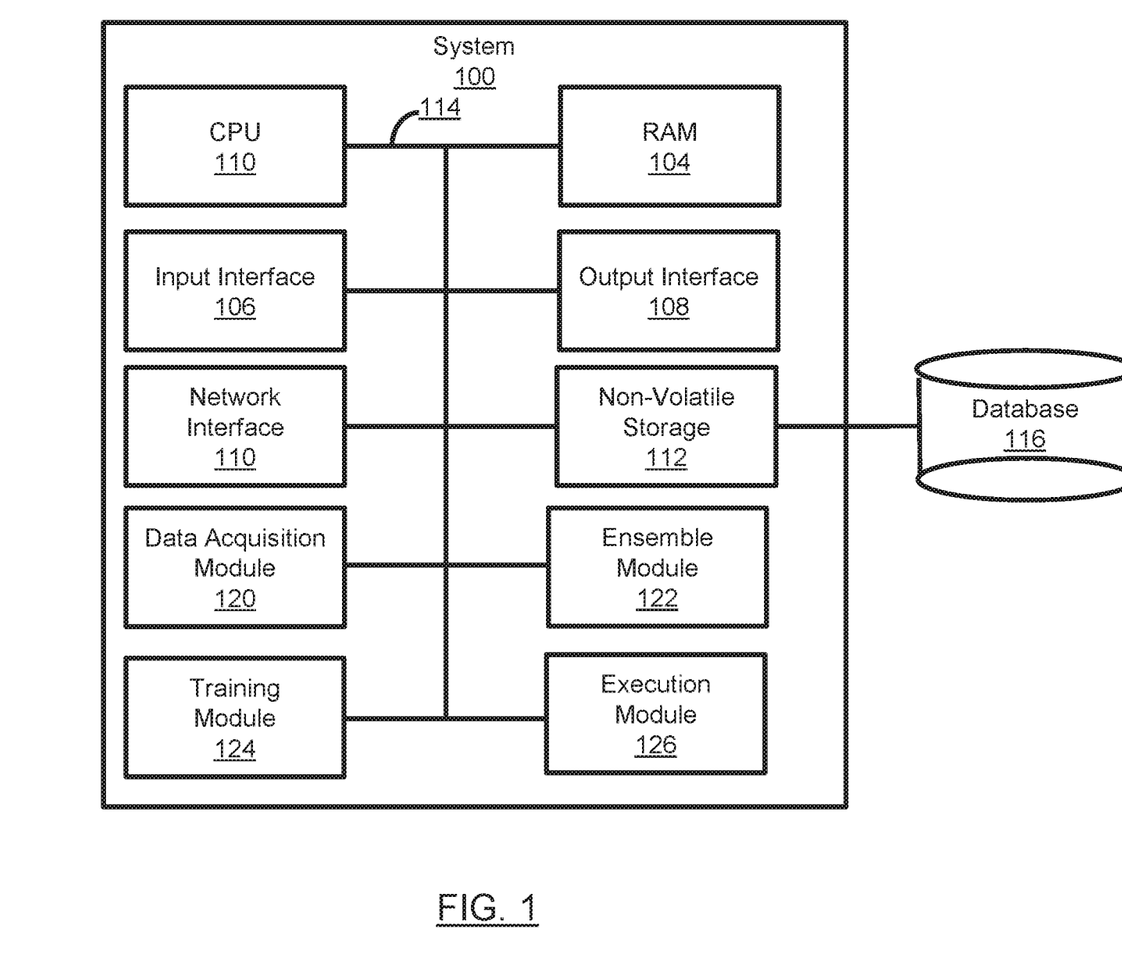
FIG. 1 is a schematic diagram of a system for model auto-selection, in accordance with an embodiment.
Figure 2:
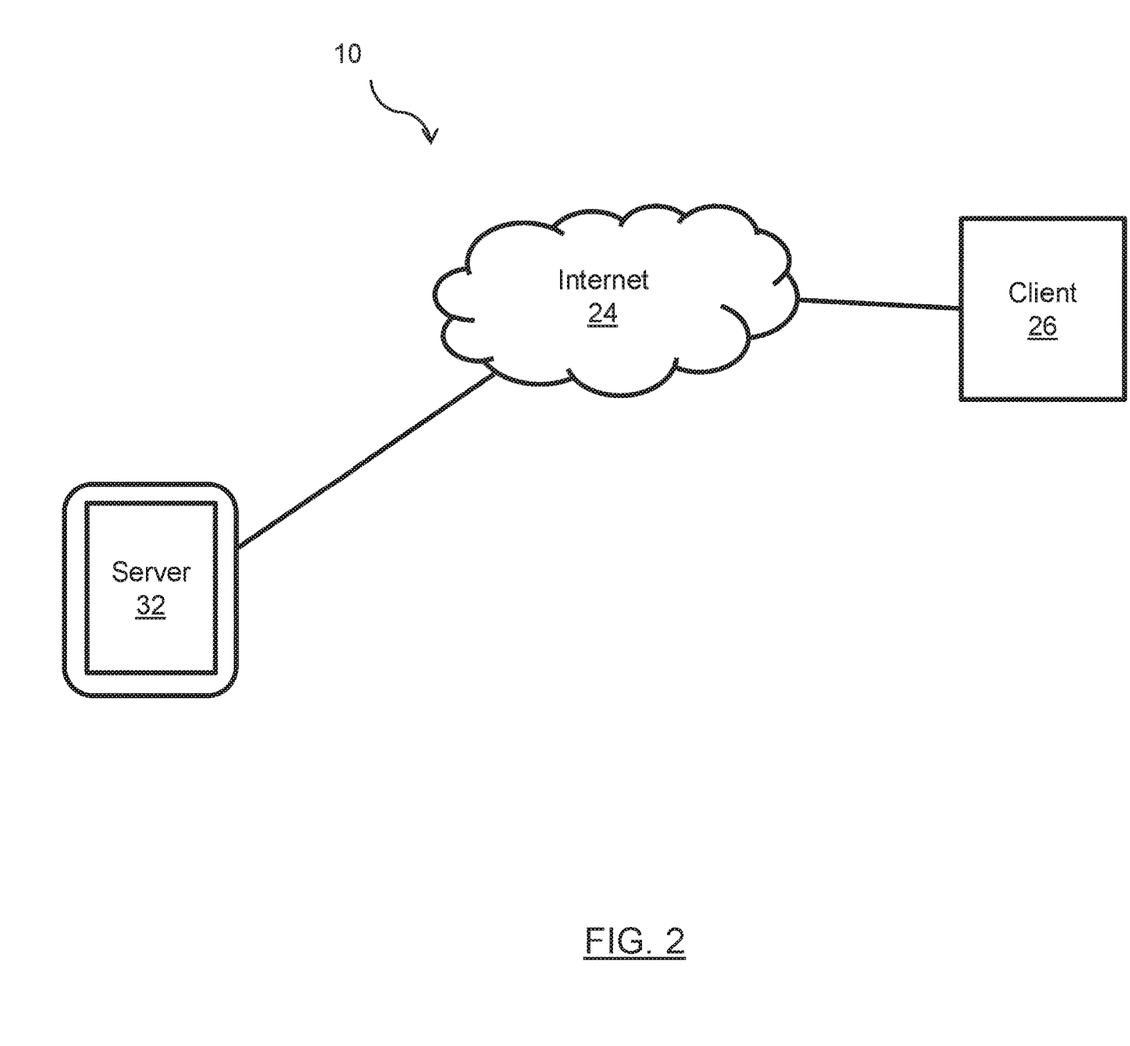
FIG. 2 is a schematic diagram showing the system of FIG. 1 and an exemplary operating environment.

Referring now to FIG. 1, a system 100 for model auto-selection in machine learning ensemble approaches, in accordance with an embodiment, is shown. In this embodiment, the system 100 is run on a client side device (26 in FIG. 2). In further embodiments, the system 100 can be run on any other computing device; for example, a desktop computer, a laptop computer, a smartphone, a tablet computer, a point-of-sale ("PoS") device, a server, a smartwatch, or the like. In this case, the system 100 is run on the client side device (26 in FIG. 2) and accesses content located on a server (32 in FIG. 2) over a network, such as the internet (24 in FIG. 2).

In some embodiments, the components of the system 100 are stored by and executed on a single computer system. In other embodiments, the components of the system 100 are distributed among two or more computer systems that may be locally or remotely distributed.

FIG. 1 shows various physical and logical components of an embodiment of the system 100. As shown, the system 100 has a number of physical and logical components, including a central processing unit ("CPU") 102 (comprising one or more processors), random access memory ("RAM") 104, an input interface 106, an output interface 108, a network interface 110, non-volatile storage 112, and a local bus 114 enabling CPU 102 to communicate with the other components. CPU 102 executes an operating system, and various modules, as described below in greater detail. RAM 104 provides relatively responsive volatile storage to CPU 102. The input interface 106 enables an administrator or user to provide input via an input device, for example, a keyboard, a mouse, a touchscreen, or the like. The output interface 108 outputs information to output devices, for example, a display, a touchscreen, speakers, or the like. The network interface 110 permits communication with other systems, such as other computing devices and servers remotely located from the system 100, such as for a typical cloud-based access model. Non-volatile storage 112 stores the operating system and programs, including computer-executable instructions for implementing the operating system and modules, as well as any data used by these services. Additional stored data, as described below, can be stored in a database 116. During operation of the system 100, the operating system, the modules, and the related data may be retrieved from the non-volatile storage 112 and placed in RAM 104 to facilitate execution.

In an embodiment, the system 100 further includes a data acquisition module 120, an ensemble module 122, a training module 124, and an execution module 126. As described herein, the system 100 can use machine learning models and/or statistical models. The one or more models can include any suitable machine learning approach or paradigm; for example, neural networks, tree-based models (for example, Random Forest, XGBoost, or the like), extrapolation models (for example, Linear Regression), or the like.

The system 100 can be used to identify an ensemble of models that perform well for a particular data category. In a particular case, historical events are used to identify an ensemble of models that perform well across a substantial quantity of the historical events. Candidate models can be trained for each event, then an ensemble of some of the trained candidate models can be built for the data category. The ensemble that generally performs best across most of the events is selected. A forecast can then be produced using the ensemble of models for future events.

Figure 3:
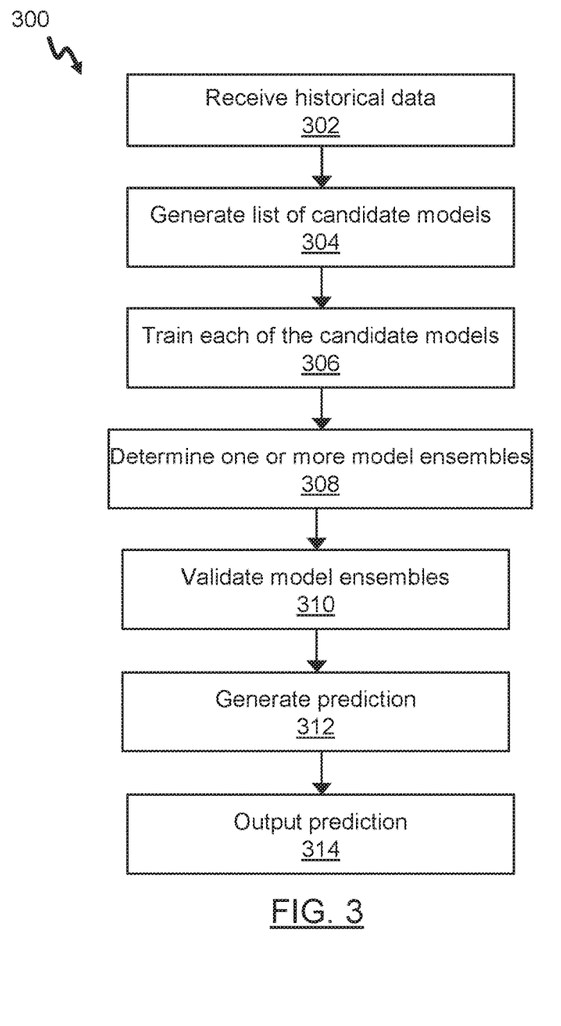
FIG. 3 is a flow chart of a method for model auto-selection, in accordance with an embodiment.

Referring now to FIG. 3, a method 300 for model auto-selection in machine learning ensemble approaches, in accordance with an embodiment, is shown. In this embodiment, an automated workflow pipeline can be generally viewed as: (1) setting up a list of candidate models; (2) building an exhaustive list of candidate ensembles of candidate models; (3) using a set of "train" events to choose a "best" model ensemble of models that perform well for a particular category; and (4) applying the model on a set of "validation" events to ensure that the ensemble of models does not act unexpectedly on unseen data.

At block 302, the data acquisition module 120 receives historical data from the database or from other computing devices over the network interface 110.

At block 304, the ensemble module 122 generates or receives a list of candidate models. In an example, the list of candidate models includes 25-50 models; and in a particular example, includes 35 models.

At block 306, the training module 124 trains each of the candidate models with at least some of the historical data. The historical data used to train the candidate models includes known prediction outcomes of the input features. Training of the candidate models involves teaching each of the models to predict an outcome variable using a separate set of features and associated weightings for each candidate model based on historical data where both the features and outcome are known. In the product sales prediction example, the outcome variable can be, for example, a number of units of a product that are sold and the features can be, for example, aspects of the product and details of a promotion for that product.

At block 308, the ensemble module 122, for each data category, determines one or more ensembles, comprising a selection of the trained candidate models, that performs best, performs substantially well, or performs approximately optimally, for generating predictions in such category.

Accordingly, given the list of candidate models, for example 30-35 models, the ensemble module 122 can determine which ensemble of models performs best, performs substantially well, or performs approximately optimally, for each data category. For each category, the ensemble module 122 automatically determines a resultant median value for each possible combination of models, the resultant median value being a median of the values predicted by each of the models in each possible combination of models. In an example, the combinations of models include groups of three models, groups of four models, and groups of five models. In this way, a median prediction is determined by the ensemble module 122 for each category for each permutation of three to five model combinations. In a particular case, the ensemble module 122 determines exhaustive permutations for combinations of three, four, and five of all the candidate models. The Applicant has determined through experimentation that ensembles comprising between three to five models is generally ideal. Less than three and the improved accuracy of an ensemble approach is typically not realized, the ensemble may not generalize well for future predictions, and there is a greater tendency to overfit training data. While greater than five models greatly increases the computational resources required without significant increase in accuracy or predictive capability, and it may be overly specific to the constituent models. It is also appreciated that ensembles can include only combinations of one of three, four, or five models; or only combinations of three and four, or four and five models. While the present embodiment describes ensembles of 3 to 5 models, it is appreciated that further embodiments can include any suitable number of models in an ensemble.

In some cases, to find the optimal ensemble, the ensemble module 122 determines a weighted error measurement (WMAPE) to determine an error between a combination's prediction and the actual outcome in the historical data. In a particular case, the ensemble module 122 can sequentially determine median values for the different combinations of models and discard a current iteration if the combination's WMAPE is not at least 0.1 greater than the previous iteration.

In some cases, the determination of optimal ensemble can be determined by the ensemble module 122 separately from the training; for example, offline.

In further embodiments, due to the automation of the ensemble determinations, median predictions for ensembles of models can also be determined more granularly; for example, per sub-category. For example, in the product sales prediction example, instead of at a product category level (such as cleansing supplies), the median prediction can also be at a sub-category level (such as, shampoo vs. soap). In this way, predictions can be more tailored at a of increased computing resources required.

Advantageously, the ensemble module 122 can test every combination of the candidate models to determine the optimal ensemble because, in an embodiment, the ensemble module uses a metric that is not resource intensive; being determining a median of values.

For some approaches, a 'meta-machine learning model' can be used to determine the ensemble of models. In these approaches, a secondary machine learning model is trained using the outputs of the trained candidate models to locate an optimal ensemble of models for each data category. This approach is referred to as "stacking" of models. While stacking leverages the powerful predictive power of a secondary machine learning model, by necessity, it must be trained from scratch every time features of the candidate models is changed, or every time the data categories are changed. Additionally, a separate secondary machine learning model has to be trained for each quantity of models in the ensemble; for example, a secondary machine learning model has to be trained to find optimal ensembles of three models and another secondary machine learning model has to be trained to find optimal ensembles of four models, even if they share similar underlying models. Thus, using the meta-machine learning model approach is computationally expensive to compute and to update, especially in comparison to the median approach described herein. In contrast, the median approach described herein uses a median, so each model only has to be trained once per category and comparisons of all the models can be undertaken in a way that is not as computationally expensive. For example, the Applicant has experimentally determined that for the case where there are 35 candidate models in a data category, with either 3, 4 or 5 models per ensemble, determining an optimal ensemble by the ensemble module 122 on a typical computing device takes approximately five minutes.

At block 310, in some cases, the training module 124 can validate the optimal model ensembles determined by the ensemble module 122. The validation includes testing the values of the optimal model ensembles with a set of data from the historical data that is different than the data in the historical data that was used to train the candidate models.

For example, in the product sales prediction example, the training data can be associated with sales that occurred in 2016 and the validation data can be associated with sales that occurred in 2017. Further to this example, the training data can include sales occurring at thirteen points-in-time ("events") over the course of 2016 for a particular product category, these events should be representative over the various selling seasons occurring in a year. Accordingly, for each of these events, the training module 124 only has to train each of the candidate models once. The ensemble module 122 can then select the optimal ensemble, for the product category, based on these trained candidate models. Then, in this example, the training module 124 can validate the selected ensemble using seven events occurring in 2017, examining how close the prediction was to the actual sales data for those events in 2017. Advantageously, in this example, accuracy for each of the events can be determined because each of the events has real measured outcomes. In this way, each validation event can have a substantially independent outcome thus providing a number of independent verification points with which to calculate the ensemble's accuracy. While this example uses thirteen training events and seven validation events, it is contemplated that any suitable number of events can be used. In some cases, accuracy is determined by the training module 124 by determining a mean absolute percentage error (MAPE). In some cases, an ensemble determined by the ensemble module 122 is rejected if the MAPE is above a predetermined value.

At block 312, the execution module 126 receives at least one input condition for at least one data category and generates a prediction for the future using the ensemble of models for such data category. The input condition can be received from the input interface 106 or from the database 116. For example, in the sales prediction example, the input conditions can be a product, its respective category, and a future sales date for prediction; the prediction being forecasted sales for a future date range.

At block 314, the execution module 126 outputs the prediction to the output interface 108 for display to a user.

In further embodiments, the execution module 126 does not generate a prediction itself but rather sends the selected ensemble of models to another computing device via the network interface 106. In this case, the other computing device can perform the prediction using the selected ensemble of models generated by the system 100.

In a particular case, especially because ensemble selection is automated, the training of the candidate models and the selection of the optimal ensemble can be reperformed periodically without requiring human intervention, such as from a data scientist, to tune the models and make the ensemble selection.

In some embodiments, the training of the candidate models can be parallelized such that the training module 124 trains each of, or a portion of, the candidate models approximately simultaneously. For example, where there are multiple CPU (or GPU) cores 110. In some embodiments, the evaluation of medians to determine an optimal ensemble, performed by the ensemble module 122, can be parallelized. For example, determining medians for combinations of three models at approximately the same time as determining medians for combinations of four models. These parallelizations are advantageous because they can reduce the computing time required to determine an optimal ensemble for a data category.

In some embodiments, the candidate models can have groupings of models. In some cases, with groupings, the ensemble module 122 selects at least one model from at least one of the groupings. For example, in the product sales prediction example, there may be a grouping of pooled models or primed models. Such types of models are useful if a product or group of products in a product category has a scarcity of historical data. By forcing the ensemble module to select at least one of these types of models in the ensemble, it covers future situations where a product sales prediction is required but the product has a dearth of historical sales data. Other types of suitable groupings of models are contemplated; for example, groupings of models with similar, but not the same, features, groupings of models that are trained on a subcategory level, groupings of models that include parent categories (where the categories have a hierarchy), or the like. In further cases, the ensemble module 122 can have rules based on how many of each grouping to select where there is more than one grouping.

In some embodiments, the ensemble module 122 uses various metrics, alone or in combination, to determine an optimal ensemble of models; for example, median, mean, statistical variance, or the like.

In some embodiments, the ensemble module 122 receives a list of candidate models, with their respective features, and in some cases with their respective weightings, from a user (data scientist) via the input interface 106. Due to the approach of the system 100, there is generally not a price for receiving models that do not have provide significantly accurate predictions for a data category because such models will be ignored during the selection of the optimal ensemble.

Figure 4:
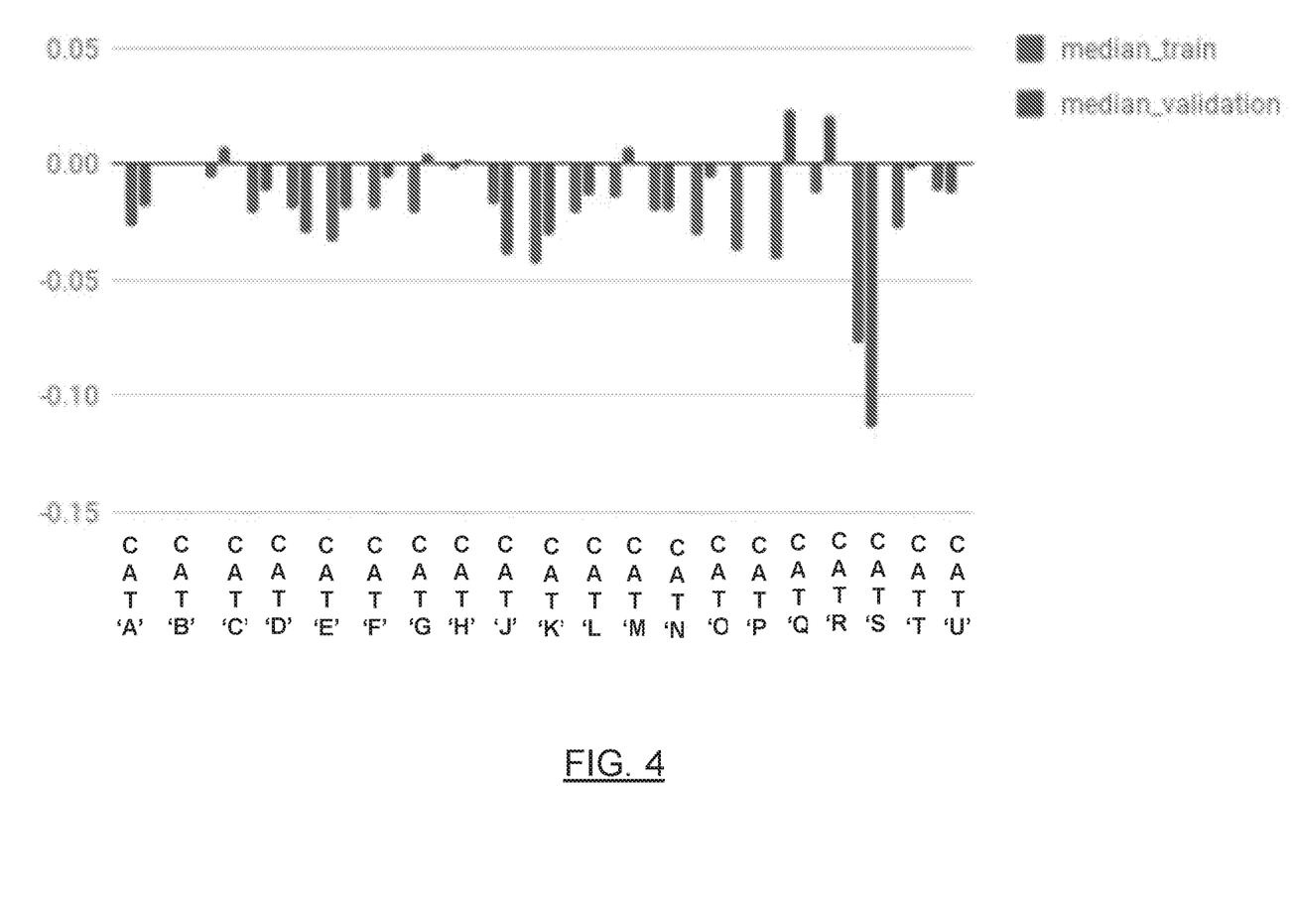
FIG. 4 is a chart of error measurements for exemplary implementation of the system of FIG. 1.

For the product sales prediction example, the Applicant experimentally determined that the approach of system 100 can have various empirical advantages. In a first experiment, a set of candidate ensembles consisted of non-seasonal models, seasonal-models, and models with holiday and payday features. In this case, the ensemble module 122 considered ensembles of four and five models, for a total of 1120 candidate ensembles. The WMAPE "threshold" value used was 0.01. A chart of the experimental results is shown in FIG. 4 for categories 'A' to 'U'. As seen, for most categories, there is an improvement in accuracy measured by WMAPE for both training and validation (where a lower value is an improvement).

Figure 5:
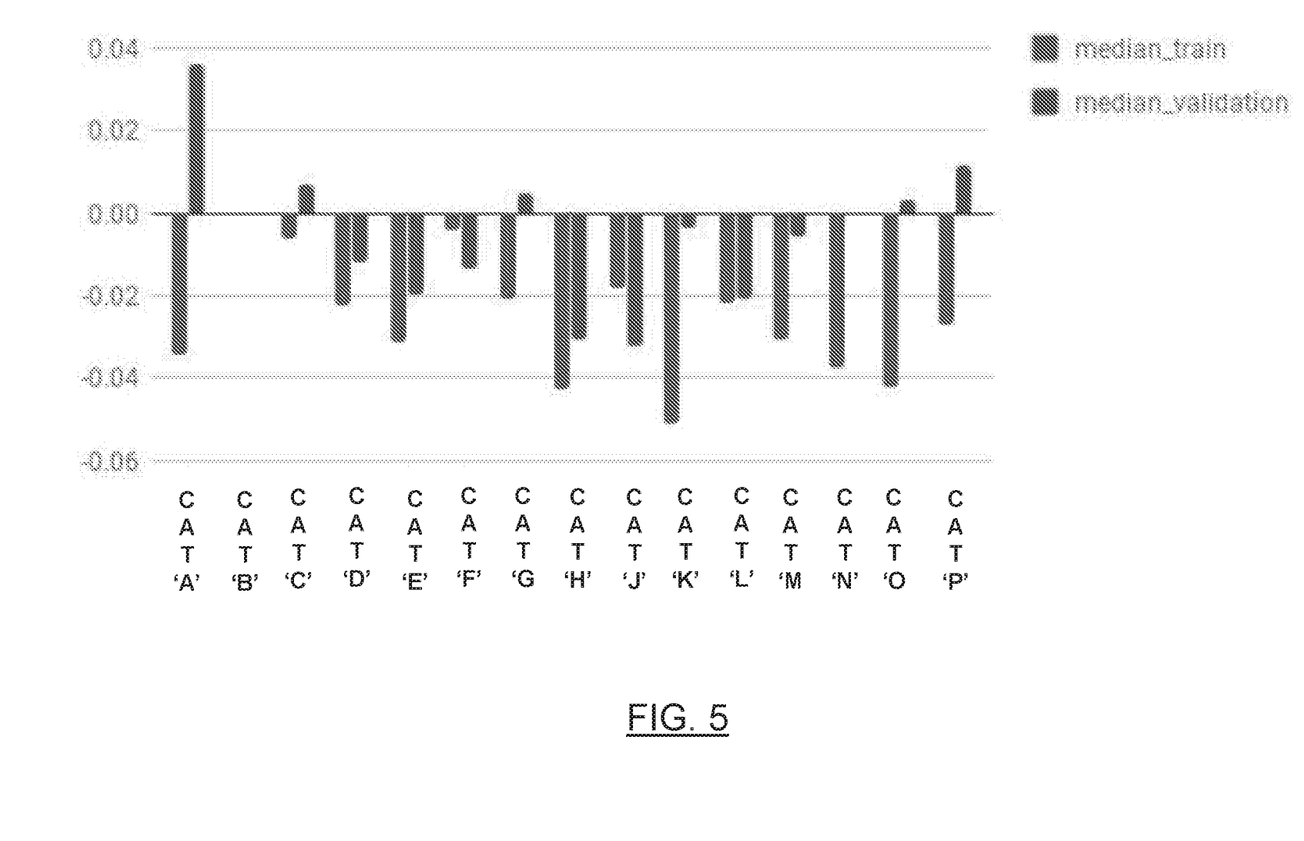
FIG. 5 is a chart of error measurements for another exemplary implementation of the system of FIG. 1.

In a second experiment, a set of candidate ensembles consisted of non-seasonal models, seasonal-models, models with holiday and payday features, and some models having new features. In this case, the ensemble module 122 considered ensembles of four and five models, for a total of 34560 candidate ensembles. A chart of the experimental results is shown in FIG. 5 for categories 'A' to 'P'. As seen, for most categories there is an improvement in accuracy measured by WMAPE for both training and validation. The mean improvement was approximately 14%.

Advantageously, the system 100 represents a powerful pipeline implementation for an ensemble approach because, for example, it is not necessary to retrain all the models whenever features of the models change.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

The invention claimed is:

1. A method for model auto-selection for a prediction using an ensemble of machine learning models, the method executed on at least one processing unit, the method comprising:
   receiving historical data, the historical data comprising previous outcomes of a plurality of events associated with a plurality of data categories;
   training candidate machine learning models with the historical data, each candidate machine learning model trained using a respective one of the data categories;
   for each data category of the plurality of data categories:
      obtaining a respective prediction from each of the candidate machine learning models for that respective data category;
      determining a respective plurality of possible combinations of the candidate machine learning models for that respective data category;
      determining, for each of the respective plurality of possible combinations of the candidate machine learning models, a median prediction that is the median of the predictions of the candidate machine learning models of that respective combination; and
      determining the combination of the respective plurality of possible combinations that has the median prediction that is closest to at least one of the previous outcomes as a respective ensemble of machine learning models for that respective data category; and outputting the respective ensemble of models for the respective data category for each of the plurality of data categories.

2. The method of claim 1, wherein at least two of the candidate machine learning models are trained in parallel.

3. The method of claim 2, wherein the determining of the median prediction for at least two combinations is performed in parallel.

4. The method of claim 1, wherein the respective ensemble of models comprises three, four, or five models.

5. The method of claim 1, wherein the candidate machine learning models comprise 25 to 50 models.

6. The method of claim 1, wherein determining the combination that has the median prediction that is closest to at least one of the previous outcomes comprises determining the closeness by determining a weighted error measurement (WMAPE) of an error between the prediction of each combination and the respective outcome in the historical data.

7. The method of claim 5, wherein determining the combination that has the median prediction that is closest to at least one of the previous outcomes further comprises iteratively determining median values for each of the combinations and discarding the combination of the present iteration if the respective WMAPE is not at least a predetermined amount greater than the previous iteration.

8. The method of claim 6, wherein the predetermined amount is 0.1.

9. The method of claim 6, wherein the predetermined amount is 0.01.

10. The method of claim 1, further comprising receiving at least one input condition for at least one data category, feeding the input condition into the ensemble of models to generate the median prediction, and outputting the median prediction.

11. A method for model auto-selection for a prediction using an ensemble of machine learning models, the method executed on at least one processing unit, the method comprising:

receiving historical data, the historical data comprising previous outcomes of a plurality of events associated with a plurality of data categories;

training candidate machine learning models with the historical data, each candidate machine learning model trained using a respective one of the data categories;

for each data category of the plurality of data categories:
  obtaining a respective prediction from each of the candidate machine learning models for that respective data category;
  determining a respective plurality of possible combinations of the candidate models for that respective data category;
  determining, for each of the plurality of respective possible combinations of the candidate models, a prediction based on the predictions of each of the candidate machine learning models in that respective combination; and
  determining one of the plurality of possible combinations of the candidate models having a prediction that is closest to the respective previous outcomes as a respective ensemble of machine learning models for the data category; and outputting the respective ensemble of models for the respective data category for each of the plurality of data categories.

12. A system for model auto-selection for a prediction using an ensemble of machine learning models, the system comprising one or more processors in communication with a data storage, the one or more processors configurable to execute:

a data acquisition module to receive historical data, the historical data comprising previous outcomes of a plurality of events associated with a plurality of data categories;

a training module to train candidate machine learning models with the historical data, each candidate machine learning model trained using a respective one of the data categories;

an ensemble module to determine, for each data category of the plurality of data categories, an ensemble of machine learning models for each data category by:
  obtaining a respective prediction from each of the candidate machine learning models for that respective data category;
  determining a respective plurality of possible combinations of the candidate machine learning models;
  determining, for each of the respective plurality of possible combinations of the candidate machine learning models, a median prediction that is the median of the predictions of the candidate machine learning models of that respective combination; and
  determining the combination of the respective plurality of possible combinations that has the median prediction that is closest to at least one of the previous outcomes as a respective ensemble of machine learning models for that respective data category; and an execution module to output the respective ensemble of models for the respective data category for each of the plurality of data categories.

13. The system of claim 12, wherein each of the candidate machine learning models are trained in parallel on different subsets of one or more processors of the one or more processors.

14. The system of claim 13, wherein the determining of the median prediction for at least two combinations is performed in parallel.

15. The system of claim 12, wherein the respective ensemble of models comprises three, four, or five models.

16. The system of claim 12, wherein the candidate machine learning models comprise 25 to 50 models.

17. The system of claim 12, wherein determining the combination that has the median prediction that is closest to at least one of the previous outcomes comprises determining the closeness by determining a weighted error measurement (WMAPE) of an error between the prediction of each combination and the respective outcome in the historical data.

18. The system of claim 17, wherein determining the combination that has the median prediction that is closest to at least one of the previous outcomes further comprises iteratively determining median values for each of the combinations and discarding the combination of the present iteration if the respective WMAPE is not at least a predetermined amount greater than the previous iteration.

19. The system of claim 12, wherein the execution module further receives at least one input condition for at least one data category and outputs the median prediction after the input condition is fed into the ensemble of models to generate the median prediction.

20. The system of claim 19, wherein outputting the ensemble of models comprises communicating the ensemble of models to a separate computing device.

* * * * *